United States Patent [19]

Wiklund

[11] 4,295,201

[45] Oct. 13, 1981

[54] ELECTRONIC DISTANCE-MEASURING INSTRUMENT

[75] Inventor: Klas R. Wiklund, Täby, Sweden

[73] Assignee: AGA Aktiebolag, Lidingo, Sweden

[21] Appl. No.: 68,440

[22] Filed: Aug. 21, 1979

[30] Foreign Application Priority Data

Apr. 27, 1979 [SE] Sweden .............................. 7903749
Jun. 18, 1979 [SE] Sweden .............................. 7905325

[51] Int. Cl.³ .............................................. G01B 7/14
[52] U.S. Cl. .................................... 364/561; 364/560; 356/3
[58] Field of Search ............... 364/443, 453, 454, 447, 364/449, 560, 561, 562, 559, 731, 456; 356/3, 5, 152; 33/356

[56] References Cited

U.S. PATENT DOCUMENTS

| | | | |
|---|---|---|---|
| 3,680,355 | 8/1972 | Goldstein et al. | 364/453 |
| 3,991,361 | 11/1976 | Mattern et al. | 33/356 |
| 4,006,631 | 2/1977 | Garner | 33/356 |
| 4,038,527 | 7/1977 | Brodie et al. | 364/453 |
| 4,070,674 | 1/1978 | Buell et al. | 364/453 |
| 4,113,381 | 9/1978 | Epstein | 356/5 |
| 4,134,681 | 1/1979 | Elmer | 356/152 |
| 4,146,927 | 3/1979 | Erickson et al. | 356/5 |
| 4,179,741 | 12/1979 | Rossani | 364/559 |
| 4,192,002 | 3/1980 | Draper | 364/449 |

*Primary Examiner*—Charles E. Atkinson
*Assistant Examiner*—Gary Chin
*Attorney, Agent, or Firm*—Larson and Taylor

[57] ABSTRACT

A distance measuring instrument is provided for simple fieldwise mapping of an area. The instrument comprises an electronic distance meter, a unit for determining a vertical angle for aligning the instrument with a measuring point, and a unit for obtaining a horizontal angle for the alignment of the instrument with a measuring point. The horizontal angle unit comprises a terrestrial magnetic-field detector which comprises at least two detector units fixedly mounted in the instrument. The units are directed in mutually different directions so that at least two components of the magnetic flux in an instrument-based coordinate system are obtained by the units. A calculating unit is arranged to convert the coordinates of the components of the terrestrial magnetic field from the instrument-based coordinate system to an earth-based coordinate system. The vertical angle obtained from the vertical angle unit is used for this conversion. The calculating unit is arranged to calculate the direction of the terrestrial magnetic field in a horizontal plane and determine the horizontal angle relative to a reference direction.

7 Claims, 5 Drawing Figures

ELECTRONIC DISTANCE-MEASURING INSTRUMENT

FIELD OF INVENTION

The present invention relates to an electronic distance-measuring instrument and more particularly to an electronic distance-measuring instrument basically comprising an electronic distance meter (EDM); a unit for establishing at least one vertical angle and a unit for establishing the horizontal angle of the instrument; and an analog or digital calculator unit for deriving the desired measurement information from the inputs thereto.

BACKGROUND OF THE INVENTION

There are a number of requirements that distance-measuring instruments must meet, depending on the use to which the instrument is to be put. There is, in many instances, a need to measure the distance and direction from one fixed point to different locations remote therefrom in a rapid and expedient manner. Further, the instrument used should be capable of being readily moved and manipulated and of permitting measurements to be made without it being necessary to adjust the instrument to any particular position before the measurements can be made. One example of a situation in which an instrument having these characteristics is particularly useful is the measuring of roads or tracks in forests, or when measuring distances in the countryside in general, such as in connection with minor roads or paths, grain fields, etc. In such instances it is also preferable to have an instrument in which it is possible to refer the measurements to a suitable selectable reference direction.

SUMMARY OF THE INVENTION

The present invention concerns an instrument having the characteristics discussed above. The instrument of the invention includes a horizontal-angle unit which comprises a detector for detecting the earth's magnetic field (terrestrial magnetic field), which detector comprises at least two detector units which are fixedly mounted on the instrument and which are aligned in different directions in a manner such that at least two components of the magnetic flux can be established in an instrument-based coordinate system with the aid of signals from the detector. The instrument also comprises a calculator which converts the coordinates of the components of the terrestrial magnetic field from the instrument-based coordinate system to an earth-based coordinate system with the aid of the result obtained from a vertical angle measuring unit and which calculates the direction of the terrestrial magnetic field in a horizontal plane.

The main part of the instrument of the invention is an electronic distance meter (EDM). This distance meter is either used in conjunction with a reflective surface, such as a corner cube prism, purposely placed on an object such as to permit the distance of the object from a fixed point to be measured, or used to measure the distance from the fixed point to the object without the use of a reflective surface. Although this latter method is less accurate than the former, the degree of accuracy obtained with the latter is fully acceptable with respect to the fields of use for which the instrument is intended.

The instrument of the invention also comprises an arrangement for determining the angle between the line of sight of the instrument with respect to a measuring point and the vertical or, alternatively, the horizontal plane, or a value in accordance with a function of this angle. The instrument is aligned horizontally by the operator. This can be effected solely "by feel," in which case the instrument is provided with a single-leg stand and the operator, when carrying out a measuring operation, grips two handles arranged on the top of the instrument on both sides thereof. This latter approach provides sufficient accuracy at least with respect to those latitudes in which the terrestrial magnetic field is practically horizontal, i.e., latitudes close to the equator. When accurate horizontal alignment of the instrument is required, the instrument is either provided with a level indicator so that the instrument can be accurately adjusted in the direction in question by the operator before commencing a measuring operation, or is provided with a vertical-angle indicator for alignment in the said direction.

With the aid of the values obtained from the distance meter, the arrangement for measuring the alignment angles of the instrument relative to the object, the terrestrial magnetic-flux detector and, optionally, the angle indicator for horizontal alignment, a microprocessor calculates the horizontal distance from the fixed point to the measuring point of the object and the direction in the horizontal plane relative to a reference direction. This reference direction can be obtained by a previous measuring operation with the instrument directed towards a reference measuring point. The reference direction in the horizontal plane is calculated by the microprocessor in relation to the direction of the horizontal portion of the terrestrial magnetic flux, and stored in the microprocessor.

The measuring result, i.e., the result of the calculations made by the microprocessor, and the output signal from the first vertical-angle indicator are converted in a manner such that the detected angle between the alignment line of the instrument to the object to be measured (the line of sight of the instrument) and the horizontal plane is displayed, preferably digitally, by the instrument. It is also possible with the aid of the instrument to take several measurements from the fixed point to a plurality of different objects, these distances being measured and calculated in relation to the same reference direction. A complete series of measurements can be made by the operator, and the calculated result of these measurements can be stored in the storage unit of the microprocessor. Upon completion of this series of measurements, the operator can then obtain, in sequence, the results on the display units of the instrument and/or transfer the result to some kind of permanent storage, such as the tape of a tape recorder.

Other features and advantages of the invention will be set forth in, or apparent from, the description of preferred embodiments of the invention found below.

BRIEF DESCRIPTION OF THE DRAWINGS

The invention will now be described in more detail with reference to the accompanying drawings, in which.

DESCRIPTION OF THE PREFERRED EMBODIMENTS

Figure 1:
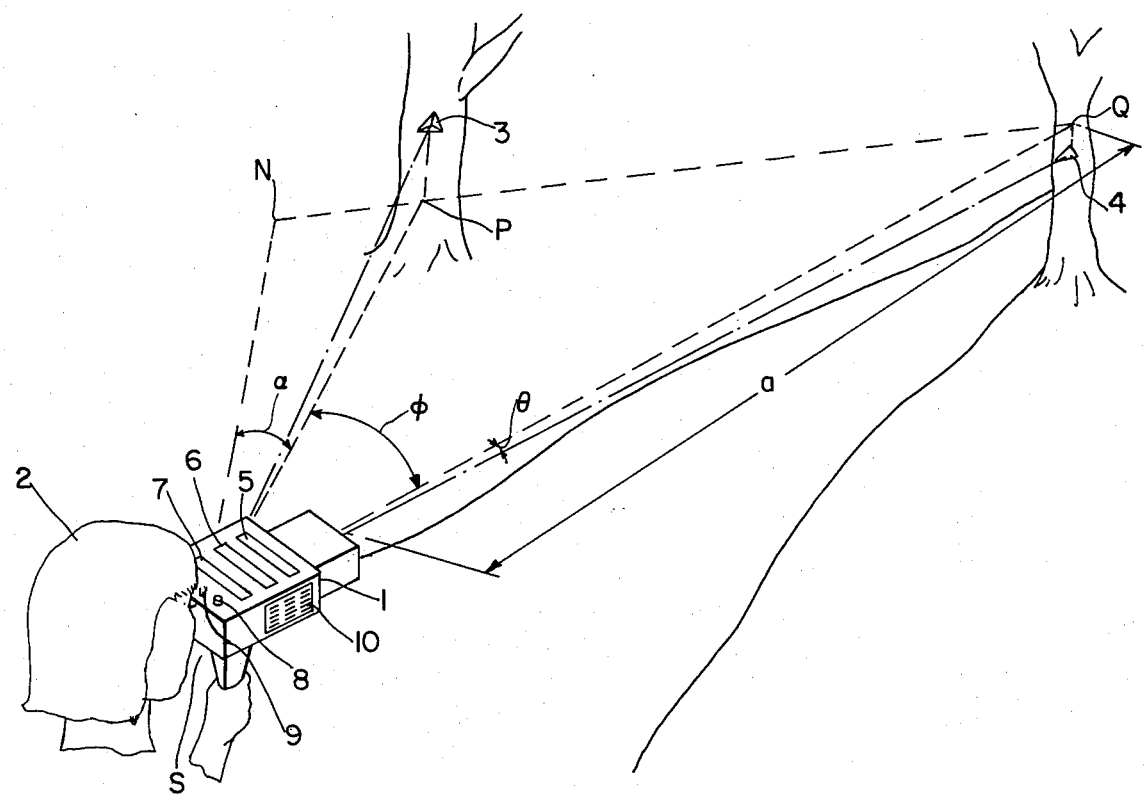
FIG. 1 schematically illustrates an instrument according to the invention, in use.

FIG. 1 illustrates an instrument, denoted 1 and constructed according to the invention, used to measure distances in a forest in the example under consideration. In the FIG. 1 embodiment, the instrument is held without any form of mechanical support. In the use of the instrument, an operator, denoted 2, first directs the instrument 1 onto a reference-measuring point which, in the illustrated embodiment, is a reflector 3, in the form of a corner cube prism, placed on a tree. The operator then directs the instrument onto a further measuring point which, in the illustrated embodiment, also comprises a reflector 4, such as a corner cube prism, placed on a further tree. It is pointed out that the distance-measuring device of the instrument illustrated may also be designed in such a manner as to obviate the need of placing reflectors on the measuring points. The instrument calculates and presents on a display unit denoted 5, 6, 7, preferably digitally, the distance in the horizontal plane to the measuring point, the angle of elevation between the horizontal plane (defined by the instrument 1 and points, P,Q) and the line of sight between the instrument and the measuring point, and, when the reference point 3 is measured, angle $\alpha$ between the line of sight of the instrument in the horizontal plane and the horizontal component N-S of the terrestrial magnetic flux, and, when the measuring point 4 is measured, the distance a, the angle of elevation $\theta$, and the angle $\phi$ between the line of sight of the instrument in the horizontal plane and the direction of alignment with the reference measuring point. Further, the instrument enables the operator to indicate whether the distance being measured is the distance from the fixed point to a reference point or to an ordinary measuring point, by pressing a button 8 or 9, respectively.

Arranged in the side of the instrument 1 is a keyboard 10. The operator is able to carry out measurements from the fixed point to a multiple of measuring points in a series of measurements, in which all the horizontal alignment directions of the measuring points are given in relation to the line of sight (alignment axis) to the same reference measuring point. During these separate measuring operations, the results are stored in a memory in the microprocessor of the instrument as described below. Subsequent to completing this series of measurements, the operator is able to reproduce, one at a time, through the use of the keyboard 10, the results of the measurements on the display units 5, 6, 7. As will be understood, the measuring results stored in the processor can be transferred to a magnetic tape or played into an associated tape recorder or the like.

Figure 2:
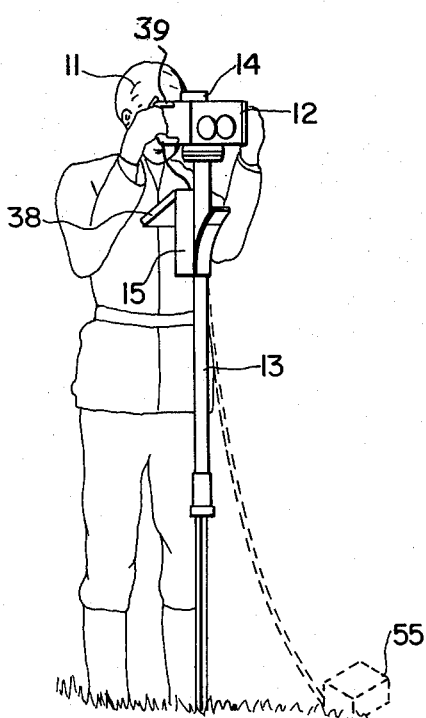
FIG. 2 illustrates a further embodiment of an instrument according to the invention, in use.

FIG. 2 illustrates a second embodiment of the instrument according to the invention, in which the instrument 12 is mounted for rotation on a single-leg stand 13, such as a so-called "James' Staff." In this embodiment, the instrument 12 is provided with a level indicator 14 by means of which the operator, denoted 11, can adjust the position of the instrument 12 prior to carrying out a measuring operation. The significance of this level indicator will be explained hereinafter. When taking a measurement, the operator 11 aligns the instrument horizontally by gripping firmly on a pair of handles 39, one on each side of the instrument 12. In order to positively level the instrument in the horizontal plane, the instrument may also be provided with a further level indicator (denoted 52 in FIG. 5 discussed below) on the side of the instrument facing the operator. It is also possible to incorporate in the instrument an angle indicator arranged to indicate the angle to the horizontal plane in a plane perpendicular to the horizontal line of alignment. This angle indicator may be of the accelerometer or pendulum type as explained below.

In the FIG. 2 embodiment, the instrument is also provided with a display unit 38 and a keyboard (not shown) is placed on the stand 13. Arranged behind the unit 38 are batteries 15 for supplying current to the instrument. When measurements are to be taken in the vicinity of busy roads or at a location in the vicinity of town traffic, a fluctuating magnetic field will be obtained, owing to the fact that the magnetic effect of the vehicles is superimposed on the terrestrial magnetic field. In order to enable measurements to be made by the instrument according to the invention in spite of this problem, an additional terrestrial magnetic flux detector can be arranged in a manner such that it has the same position during the whole of a measuring sequence. The direction given by this detector in respect of the magnetic field can be used as a reference direction for the magnetic field detector located in the rotatable instrument 12. In FIG. 2, the additional terrestrial magnetic field detector is shown in dashed lines at 55 in the form of a box placed directly on the ground.

Figure 3:
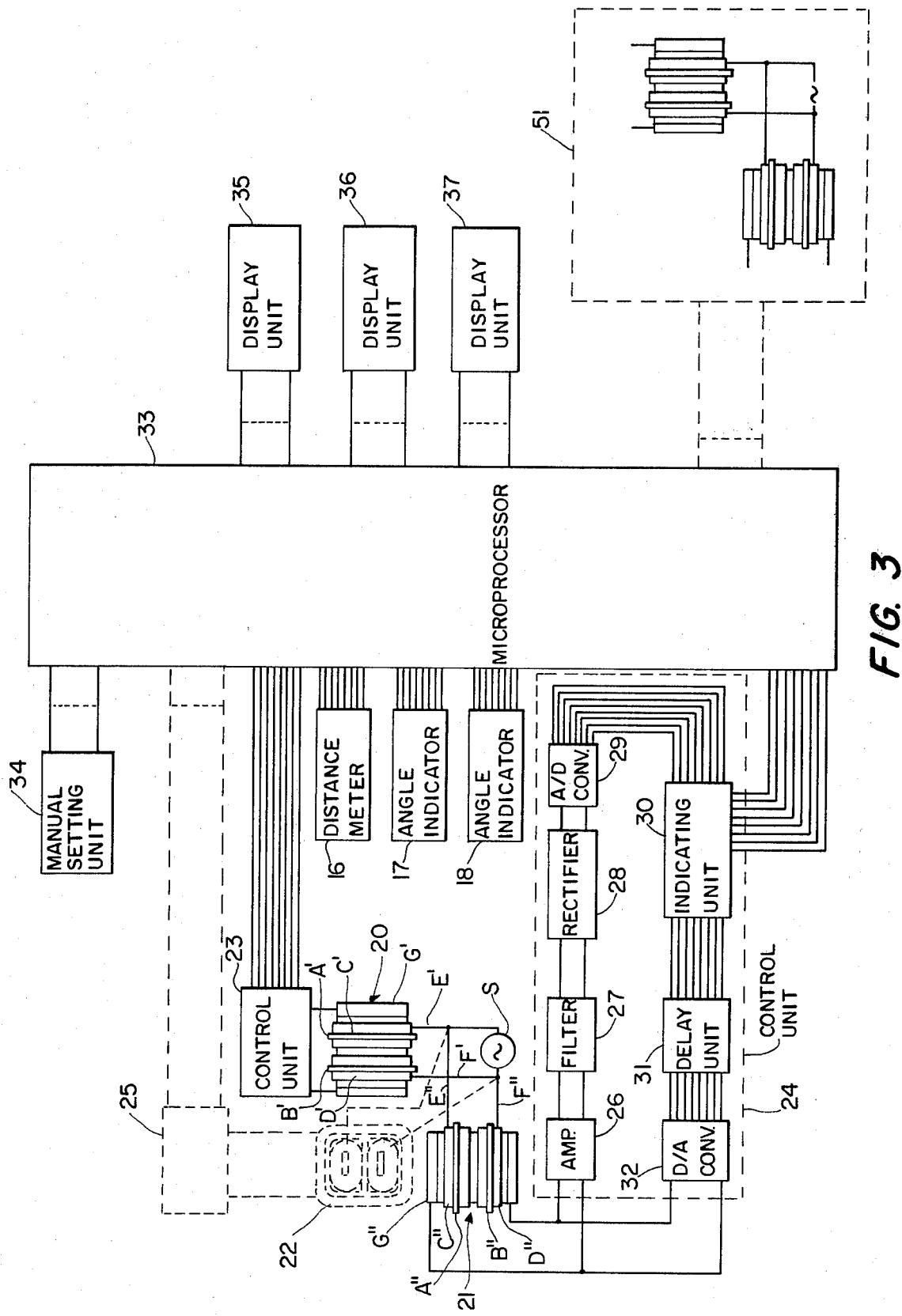
FIGS. 3 and 4 are block schematic circuit diagrams of two embodiments of the instrument of the invention.

FIG. 3 is a block form schematic circuit diagram of a first embodiment of the invention. The instrument includes a terrestrial magnetic flux detector comprising two units 20, 21, and at least one vertical-angle indicator 17. The instrument also comprises, in a conventional manner, an electronic distance meter (EDM) 16 which can either be of the phase comparison type or of the time measuring type and may optionally provide a measurement capability using direct reflection from the target itself. In this embodiment, the instrument comprises a vertical-angle indicator 17 which may be of the accelerometer or pendulum type. An example of a suitable vertical-angle indicator for use in this connection is described and illustrated in U.S. patent application Ser. No. 37,105, filed on May 8, 1979, the subject matter of which is hereby incorporated by reference.

The angle indicator 17 produces an output signal which is a function of the angle between the horizontal plane and the direction of alignment of the distance meter 16 to the measuring point, i.e., the line of sight between the meter 16 and the target. In an instrument-based coordinate system, this direction constitutes the $X_I$-axis where the subscript I indicates the instrument-based coordinate system. If the instrument is not aligned in the horizontal plane, e.g. with the aid of a level-indicating device, in a manner such that the $Y_I$-axis of the instrument is parallel with the earth-bound horizontal plane, the instrument may be provided with a further angle indicator 18 of the same type as the angle indicator 17, the second angle indicator 18 being used to provide an indication of the slope of the $Y_I$-axis of the instrument relative to the earth-bound horizontal plane.

As stated, the instrument preferably includes a 2-axis detector 20, 21 for the terrestrial magnetic field. Each of the units 20, 21 is per se conventional and, for example, can be constructed in the same manner as the detector for determining the terrestrial magnetic field described in the Swedish Pat. No. 330,620, with the exception that these units are not, as described in said patent specification, held in the horizontal position by being mounted on a horizontal cardan, but instead mounted so as to determine the components of the terrestrial magnetic field along the axes $X_I$ and $Y_I$ in the instrument-based coordinate system. The two magnetic field detectors 20, 21, which are of identical construction but arranged at right angles to each other, comprise two rod-like magnetic cores A', B' and A", B", respectively, each of which is surrounded by a coil C', D' and C", D", respectively. An alternating voltage, suitably of frequency 400 Hz, is supplied from an AC source, denoted S, connected to the coils across the outputs E', F' and E", F", respectively. The coils are so wound that the fluxes produced by the alternating voltage applied thereto are mutually opposed, whereby the terrestrial magnetic field, in detecting direction of alignment of the detector, is superimposed in opposite direction on the counterdirected fluxes. Both of the coils C', B' and C", B" are respectively surrounded by a further coil G" and G", respectively, in which there is generated an output signal which carries information concerning the magnitude of the component of the terrestrial magnetic field extending parallel with the direction for the magnetic cores A', A" and B', B".

If the direction in question deviates from a line extending east-west, there is obtained from the detector formed by units 20, 21, an output signal whose amplitude is in specific relationship to the component of the terrestrial magnetic field in the direction of the magnetic cores A', A" and B', B". This output signal, which has a frequency of 800 Hz, is supplied to each of a pair of separate control units 23 and 24, which are individually associated with detector units 20 and 21 in the two-axis terrestrial magnetic field detector.

The two control units 23, 24 are of identical construction, and hence only one control unit, 24, will be described in detail. It will be understood, however, that the make-up of control unit 24 is not restricted to the illustrated embodiments, and that many ways are known for carrying out the required control function with the same result. One method is to first make a comparison between the phase of the input signal and the phase of the output signal, to rectify the output signal and feed the same back to output lines polarized in the direction determined by the phase comparison.

In control unit 24, the output from the detecting unit 21 is fed to an amplifier 26. The direct-current voltage portion of the output signal from the amplifier 26 is filtered out by a filter 27, and the residual alternating voltage signal is rectified by a rectifier 28. The signal is then converted to digital form in an analog/digital (A/D) converter 29 whose output signal is passed to an indicating unit 30. The latter may be a part of the microprocessor incorporated in the circuit and described below, but is illustrated in FIG. 3 as a separate unit. The output signal from the indicating unit 30 is supplied to a digital/analog (D/A) converter 32 through a delay unit 31, and the D/A converter 32 feeds the rectified output signal back to the output coil.

When the magnitude and sense (direction) of this rectified voltage in the outer coil G" is such that the magnetic flux generated in the detector 21 in cores A" and B" directly offsets the effect of the terrestrial magnetic flux, the alternating voltage portion of the output signal is reduced to zero. This presents a problem since the alternating current output signal from the outer coil G" is of the same amplitude irrespective of whether the field passes in one direction or passes in a direction precisely opposite that one direction. Consequently, the indicating unit 30 is so constructed that immediately after unit 30 is supplied with the signal obtained from the converter 29, the digital/analog converter is controlled so as to produce a converted continuous voltage with a first polarity which, for example, can be accomplished by applying an "0"-signal to one of the output lines. When the field generated by the outer coil G" associated with the magnetic cores A" and B" coincides with the direction of the terrestrial magnetic field, there is obtained from this coil an intensified alternating voltage output signal. Further, if the signal fed to the input of the indicating unit 30 exceeds a given value, the indicating unit 30 changes the polarity of its output signal by, for example, producing a "1"-signal on the polarity control output line thereof, and the digital/analog converter 32 will change the polarity of the output signal. If it should happen that the detector has been placed in a purely east-west direction it may be that, by regulation, the output voltage from the converter 32 again increases after the change of polarity described above so that the alternating voltage output signal from the output coil 21 will again increase to the switching value of the indicating unit 30. If this happens a further time, the indicating unit 30 stops the output signal to the delay unit 31 and the converter 32 and thereupon measures the magnitude of the input signal from the units 21 and 26 to 29 without feedback. If the value of this signal is below a predetermined noise level, the output signal of the indicating unit 30 is set to zero; otherwise the operation of the control circuit described above is again repeated, optionally with a reversed sequence of polarity. After the indicating unit 30 has regulated the signal produced by D/A converter 32, the output signal is supplied to the input of a signal processing unit 33, preferably in the form of a microprocessor.

After a given time subsequent to the commencement of a measuring operation, corresponding to that necessary for the output signals from the control circuits 23, 24 (resulting from the input signals from indicating units corresponding to unit 30) to stabilize themselves, these signals are fed into the microprocessor 33. Also connected to the inputs of the microprocessor 33 are the outputs of the electronic distance meter 16, the angle indicator 17 and the optional angle indicator 18.

In addition to the other inputs to the microprocessor 33 there is provided a manually adjustable unit 34 by means of which the microprocessor 33 is informed whether the measurement being taken is a reference measurement or a measurement which shall have a reference. A selectable reference measurement can also be read into the microprocessor 33 by means of unit 34. In addition, the angle of inclination (slope) of the terrestrial magnetic field on the site is also read into the processor 33, it being possible to determine this inclination from tables, and the inclination not changing to any appreciable extent in adjacent sites.

The microprocessor 33 first calculates the magnitudes of the terrestrial magnetic field for the $Z_I$-direction in an instrument-based coordinate system with the aid of the angular value obtained from the angle indicator 17 (as well as the angle indicator 18 when present), the values obtained from the terrestrial magnetic field detector 20, 21 with respect to the $Y_I$ and $X_I$ directions of the terrestrial magnetic field in the instrument-based coordinate system, and the angle of inclination read into said processor 33 from unit 34. Thereafter, the coordinates of the instrument-based coordinate system are converted to the earth-based system, the two coordinates X and Y in the horizontal plane being calculated in particular, and the direction of the vector in the plane forming a starting point for calculating the horizontal reference angle.

If it is desired to avoid the necessity of reading in the inclination angle of the terrestrial magnetic field on the site, a third detector unit (indicated in dashed lines at 22) which is of the same kind as the detectors 20 and 21 and which has an associated control unit denoted 25, can be arranged to measure the magnetic field in the $Z_I$ direction. Although this is a more practical alternative, it is also more expensive.

Subsequent to its coordinate conversion to the earthbound system, in which the origins in the two systems coincide and which is made with the aid of the output signals from the angle indicator 17 (and perhaps 18), the microprocessor 33 calculates, on the basis of the measurements made in the horizontal plane, the earth-magnetic field between the measuring direction in this plane and the direction of the terrestrial magnetic field in this plane. When the measuring operation is one which constitutes a measurement which is made with reference to a previously made reference measurement, the microprocessor 33 subtracts the calculated angular value in the horizontal plane from the angular value stored in the microprocessor for the reference direction in the longitudinal plane. The values calculated by the processor 33 with respect to the distance to the measuring point in the horizontal direction, the angular position in the horizontal direction and the angular position in the vertical direction, are presented by the display units 35, 36, 37, preferably in digital form. These display units correspond to the display units 5, 6, 7 in FIG. 1. Through use of the manual setting unit 34, it is possible to manipulate the microprocessor 33 so that it stores the measuring results and collects stored measuring results from the display units when the operator so desires, by means of the keyboard 10 in FIG. 1 or keyboard 38 in FIG. 2.

Figure 4:
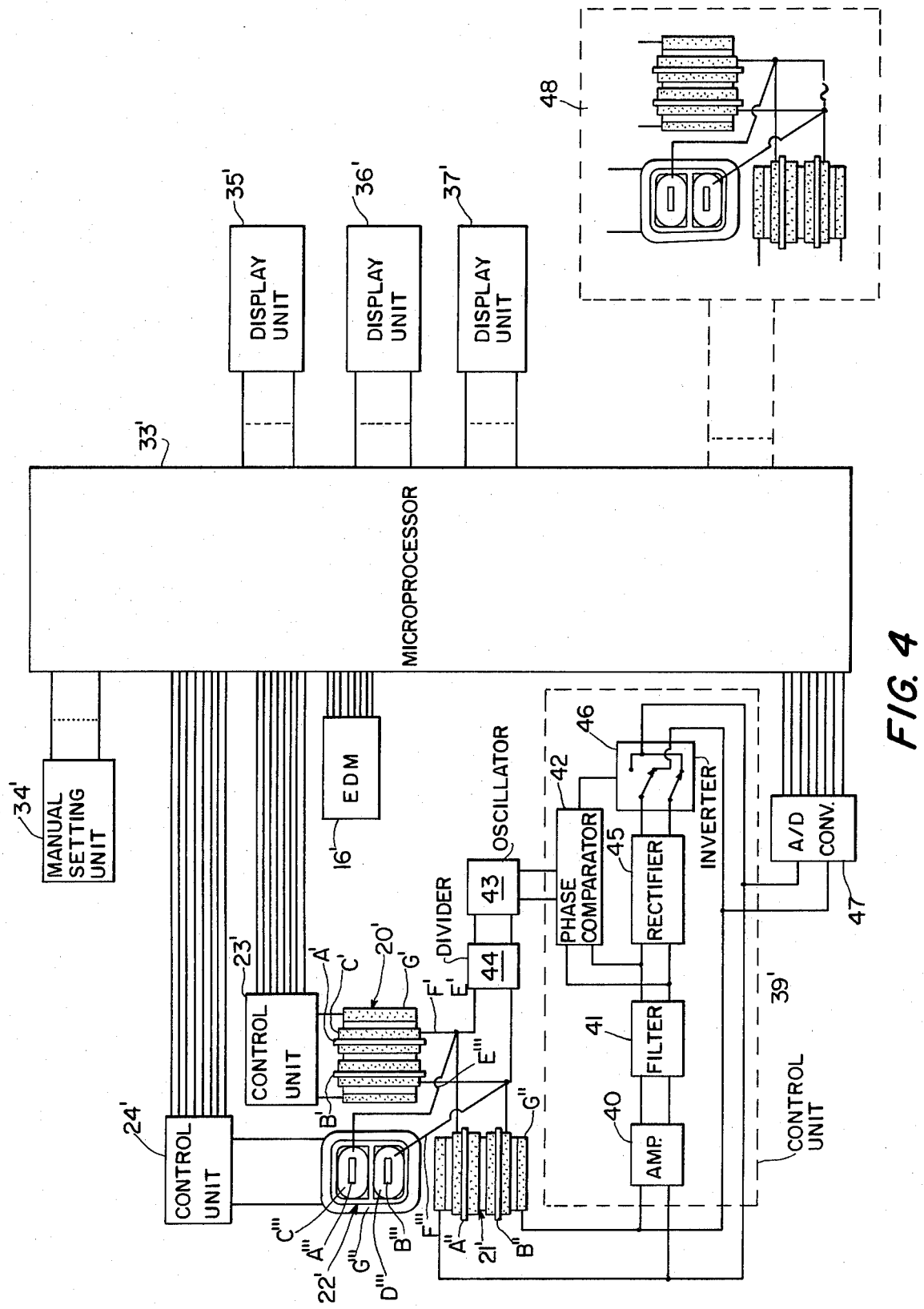

FIG. 4 is a block schematic of a further embodiment of the instrument according to the invention. In this embodiment the instrument is provided with only one detector for the terrestrial magnetic field and has no angle indicator corresponding to units 17 and 18 in FIG. 3. On the other hand, the instrument is provided with the level indicator 14 shown in FIG. 2, this indicator being of the type in which an air bubble will only occupy a given position when the $X_I$-axis and $Y_I$-axis of the instrument are completely horizontal in an earthbound coordinate system. The detector for the terrestrial magnetic field is, in this instance, provided with three units for detecting the magnitude of the terrestrial magnetic field in three mutually perpendicular directions, i.e., along the $X_I$-, $Y_I$- and $Z_I$-axes. When a series of measurements is to be commenced, the operator first places the instrument in a manner such that the instrument is aligned fully horizontal by means of the level indicator 14. When the instrument is aligned so as to be fully horizontal, the operator presses a specific key and the microprocessor reads in the direction and magnitude of the terrestrial magnetic field and calculates the angles of inclination relative to the vertical. Measurements from the fixed point in question to the various measuring points can then be made. Because the angle of inclination and the magnitude of the terrestrial magnetic field has been determined before the actual measuring operations begin, the inclination of the instrument to the horizontal plane when measuring can be determined by straightforward geometrical calculations carried out by the microprocessor using the result of the initial determination and those values obtained from the detector units 20, 21, 22 during later measuring operations.

Referring to FIG. 4 there is shown a further embodiment of the control unit used with each of the detectors of FIG. 3. It will be understood that this embodiment of the control unit can also be used instead of the control unit embodiment in FIG. 3. The overall system illustrated in FIG. 4 is similar to that of FIG. 3 and like elements have been given the same reference numerals with primes attached. Turning again to FIG. 4, the output signal from the detector unit 21' is amplified in an amplifier 40 and the direct current voltage is filtered out by a high-pass filter 41. The output signal from the filter 41 is fed to a phase comparator 42 and to a rectifier device 45. The input of the detector 21' is supplied with an alternating voltage obtained from the output signal of an oscillator 43 after division by a frequency divider 44, which divides the output frequency of the oscillator 43 by two. In this way, the oscillator 43 has the same frequency as that of the detector output.

The comparator 42 compares the phase of the oscillator 43 with the phase of the output signal from the filter 41. The output of the rectifier means 45 is coupled to a controllable inverter or polarity switch 46, and the phase comparator 42 controls switching of the inverter 46 between two positions, depending on whether the incoming signals are in the same phase or in the reverse phase. The output of the inverter 46 is coupled to the output of the detector unit 21' and is regulated by the control circuit so that the output from the detector 21' is zero. The output of the detector 46 is also coupled to the input of an analog/digital (A/D) converter 47. The output of this converter is coupled to an input of the microprocessor 33' and the value of the signal produced by A/D converter 47 is proportional to the magnitude of the terrestrial magnetic field in the detecting direction of the relevant detector 21'.

As illustrated in FIG. 4, a further unit, shown within dashed line block 48, can be coupled to the microprocessor 33' for detecting the terrestrial magnetic field. This arrangement is similar to the arrangement of the detectors 20', 21', 22' and their associated control units.

Figure 5:
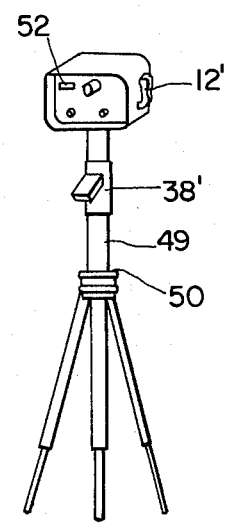
FIG. 5 illustrates yet a further embodiment of the instrument, according to the invention.

FIG. 5 illustrates an embodiment of an instrument 12 having an associated stand 49. The aforedescribed embodiments of FIGS. 1 and 2 are well suited for use in the countryside, where there is little traffic. In cities and towns, however, or at sites adjacent to highways and motorways, the terrestrial magnetic field is influenced by cars and other motorized vehicles. Other magnetic disturbance sources may also be present. A particular feature of these sources of disturbance is that they fluctuate. If a detector arrangement is fixedly placed in a location (room), e.g. immovably arranged on the stand 49 during the whole of the measuring operations, and the other detector arrangement is placed in an instrument 12, which, during a measuring sequence, is moved into alignment with different measuring points remote from and located around the fixed point at which the instrument is placed, the detected values from the arrangement 48 constitute a reference for the detected values from the detector arrangements 20, 21, 22 (or 20', 21', 22'). When measuring distances from different measuring points, the horizontal and vertical angles are calculated on the basis of the differences obtained between the two different arrangements for detecting the terrestrial magnetic field, the fixed arrangement constituting a reference which has been placed with two of its detecting directions in the horizontal plane. A level indicator 50 of the same type as the level indicator 14 is suitably placed on the stand 49, so that the operator is able to position the stand 49 correctly in the horizontal plane.

It will be understood that a similar kind of arrangement can be incorporated in the embodiment illustrated in FIG. 3, as indicated by the block 51. It will also be obvious that only two detector units are needed, since the angle indicator 17 is provided. The FIG. 5 embodiment also includes a level indicator 52, by means of which the operator is able to position the instrument horizontally, transversely of the measuring direction.

The box 55 shown in dashed lines in FIG. 2 can contain the additional terrestrial magnetic field detector, which remains stationary during a measuring series. If the box 55 is placed in any selected position on the ground by the operator at the commencement of a measuring operation, the terrestrial magnetic field detector conveniently comprises three units such as shown in block 48 in FIG. 4. The box may also be provided with adjustable legs and a level indicator of the same type as the level indicator 14 (the box 55 then being placed horizontally by the operator) and the additional terrestrial magnetic field detector need only comprise two units adjusted to indicate the terrestrial magnetic field in two mutually perpendicular directions in the horizontal plane.

It will be understood by those skilled in the art that the invention is not restricted to the embodiments which are described and illustrated, but can be modified within the scope of the following claims. For example, other types of terrestrial magnetic field detectors than those described with reference to FIGS. 1 and 5 can be used, a Hall-generator being a suitable type of detector.

Thus while the invention has been described relative to exemplary embodiments thereof, it will be understood that other variations and modifications can be effected in these embodiments without departing from the scope and spirit of the invention.

I claim:

1. An electronic distance measuring instrument comprising an electronic distance meter; vertical angle determining means for establishing at least one vertical angle; horizontal angle determining means for establishing the angle between the instrument and the horizontal plane; and calculating means for trigonometrical transformations of input signals received by the instrument, said horizontal angle determining means comprising a terrestrial magnetic field detector comprising at least two detector units which are fixedly mounted in the instrument and which are oriented in different directions so that at least two components of the magnetic flux in an instrument-based coordinate system can be established with the aid of the detector units; said calculating means including means for converting the components of the terrestrial magnetic field from the instrument-based coordinate system to an earth-based coordinate system using an input signal from the vertical angle determining unit; for calculating the direction of the terrestrial magnetic field in a horizontal plane; and for calculating the horizontal distance from fixed point to a measuring point based on the said input signals and the data obtained from said electronic distance meter.

2. An instrument according to claim 1, wherein, for use in making a reference measurement, said calculating means includes a memory into which is selectively stored the angle in the horizontal plane between the direction of the terrestrial magnetic field and the measuring direction for an arbitrarily selected reference direction; and for use in making measurements subsequent to said reference measuring operation, the calculating means calculates the horizontal angle in relation to the reference direction.

3. An instrument according to claim 1, further comprising manual inputting means for enabling a selectable reference direction to be stored into a memory in the calculating means and wherein the calculating means is arranged to calculate the horizontal angle for measurements carried out in relation to said selectable reference direction.

4. An instrument according to claim 1 wherein the terrestrial magnetic field detector units are two in number; and wherein the inclination of the terrestrial magnetic field at the measuring site can be stored in the calculating means through a manual inputting means; wherein the vertical angle determining means comprises at least one vertical angle indicator for a predetermined direction in the instrument-based coordinate system; and wherein the calculating means is arranged to calculate the horizontal angle with the aid of the signals obtained from the two detector units, the at least one vertical angle indicator and the stored value of the inclination of the terrestrial magnetic field.

5. An instrument according to claim 1 wherein the terrestrial magnetic field detector units are three in number and have mutually different directions of alignment such that the terrestrial magnetic field in three coordinates in the instrument-based coordinate system can be established with the aid of the detector signals; and wherein the instrument is provided with means for aligning the said instrument in the horizontal direction so that the instrument can be adjusted to a given position relative to the earth-based horizontal plane; and wherein the calculating means includes a memory into which the magnitude and direction of the terrestrial magnetic field can be stored with the instrument in a said given position; wherein during measurements carried out thereafter, the calculating unit means calculates the horizontal angle and vertical angle with the aid of the stored values of the terrestrial magnetic field and the values obtained by a given measuring operation from the terrestrial magnetic field detector, the calculating means serving as a part of the vertical angle determining means for this operation.

6. An instrument according to claim 1 wherein the instrument is provided with a level indicator for enabling the instrument to be adjusted during a measuring operation in a manner such that a known line in the instrument-based coordinate system is arranged in the earth-based horizontal plane.

7. An instrument according to any one of claims 1-5, wherein the instrument is provided with a further terrestrial magnetic field detector having at least two detector units, said further detector being fixed in place in the earth-based coordinate system; and wherein the calculating means is arranged to calculate the horizontal angle and vertical angle with the aid of signals obtained from the two terrestrial magnetic field detectors.

* * * * *